(12) United States Patent
Smith, III

(10) Patent No.: US 11,413,818 B2
(45) Date of Patent: Aug. 16, 2022

(54) THREE DIMENSIONAL PRINTER HAVING PLATEN SECTIONS WITH COMPRESSIBLE VERTICAL INTERFACIAL ENGAGEMENT

(71) Applicant: 3D Systems, Inc., Rock Hill, SC (US)

(72) Inventor: James Francis Smith, III, Tega Cay, SC (US)

(73) Assignee: 3D Systems, Inc., Rock Hill, SC (US)

( * ) Notice: Subject to any disclaimer, the term of this patent is extended or adjusted under 35 U.S.C. 154(b) by 32 days.

(21) Appl. No.: 17/126,216

(22) Filed: Dec. 18, 2020

(65) Prior Publication Data

US 2021/0187846 A1    Jun. 24, 2021

Related U.S. Application Data

(60) Provisional application No. 62/950,474, filed on Dec. 19, 2019.

(51) Int. Cl.
| | |
|---|---|
| *B29C 64/245* | (2017.01) |
| *B29C 64/153* | (2017.01) |
| *B29C 64/25* | (2017.01) |
| *B33Y 30/00* | (2015.01) |
| *B29C 64/232* | (2017.01) |
| *B29C 64/209* | (2017.01) |
| *B29C 64/268* | (2017.01) |

(52) U.S. Cl.
CPC .......... *B29C 64/245* (2017.08); *B29C 64/153* (2017.08); *B29C 64/209* (2017.08); *B29C 64/232* (2017.08); *B29C 64/25* (2017.08); *B29C 64/268* (2017.08); *B33Y 30/00* (2014.12)

(58) Field of Classification Search
CPC ... B29C 64/153; B29C 64/245; B29C 64/232; B22F 10/28; B22F 12/30; B33Y 30/00
See application file for complete search history.

(56) References Cited

U.S. PATENT DOCUMENTS

| | | | |
|---|---|---|---|
| 2008/0248271 A1* | 10/2008 | Erb | F16J 15/122 428/219 |
| 2010/0090374 A1* | 4/2010 | Dietrich | B29C 64/153 264/497 |
| 2011/0072927 A1* | 3/2011 | Gilbas | F16D 1/092 74/424.76 |
| 2013/0108726 A1* | 5/2013 | Uckelmann | B29C 64/245 425/375 |
| 2017/0203514 A1* | 7/2017 | McCoy | B33Y 10/00 |
| 2018/0133800 A1* | 5/2018 | Pieger | B29C 64/153 |
| 2018/0345411 A1* | 12/2018 | Verheyen | B29C 64/153 |

(Continued)

*Primary Examiner* — Jerzi H Moreno Hernandez

(57) ABSTRACT

A three-dimensional printing system includes an array of platen sections, a plurality of compressive sheets, a chassis, a plurality of actuators, a powder dispenser, and an energy beam source. The array of platen sections individually have a top surface and a plurality of vertical side surfaces intersecting the top surface. The plurality of platen sections are positioned with adjacent pairs of platen sections having a pair of the vertical side surfaces in facing relation with each other and defining a vertical gap therebetween. Thus they define a plurality of vertical gaps over the array of platen sections. The plurality of compressible sheets fill the plurality of vertical gaps. The chassis supports the array of platen sections. The plurality of actuators is for individually and vertically positioning the platen sections.

20 Claims, 13 Drawing Sheets

(56) References Cited

U.S. PATENT DOCUMENTS

2019/0143589 A1\* 5/2019 Wang .................... B29C 64/245
                                                                        425/110
2020/0108465 A1\* 4/2020 Sweetland ............. B33Y 30/00
2020/0324339 A1\* 10/2020 Zhang ................... B29C 64/153

\* cited by examiner

THREE DIMENSIONAL PRINTER HAVING PLATEN SECTIONS WITH COMPRESSIBLE VERTICAL INTERFACIAL ENGAGEMENT

CROSS-REFERENCE TO RELATED APPLICATIONS

This non-provisional patent application claims priority to U.S. Provisional Application Ser. No. 62/950,474, Entitled "Three Dimensional Printer Having Platen sections with Compressible Vertical Interfacial Engagement" by James Francis Smith III, filed on Dec. 19, 2019, incorporated herein by reference under the benefit of U.S.C. 119(e).

FIELD OF THE INVENTION

The present disclosure concerns an apparatus and method for a layer-by-layer fabrication of three dimensional (3D) articles utilizing powder materials. More particularly, the present disclosure concerns an optimal build platform design for minimizing a use of powder material.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered materials. Each layer of powdered material is selectively fused at a build plane using an energy beam such as a laser, electron, or particle beam. In other systems the powder is selectively fused by selectively printing or dispensing an absorber onto the powder and then using a blanket exposure of radiation to selectively fuse the powder. One issue with such printers is the high cost of the powder materials. Another issue is with a temperature of a build volume around the article being fabricated.

SUMMARY

Figure 1:
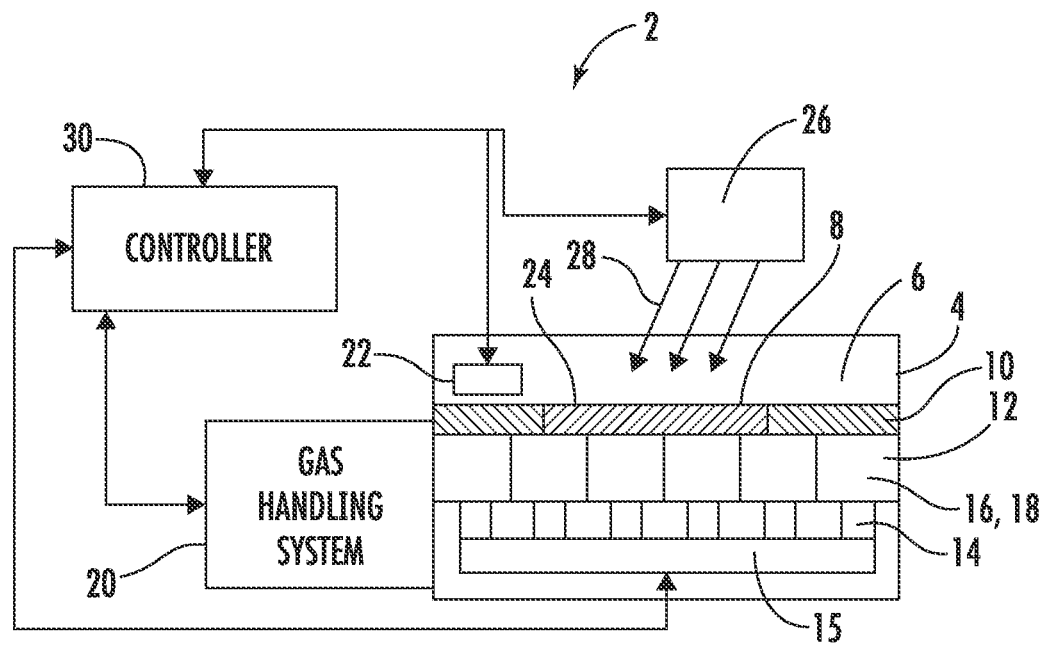
FIG. 1 is a schematic diagram of an embodiment of a three-dimensional printing system for manufacturing or fabricating a three-dimensional article.

In a first aspect of the disclosure, a three-dimensional printing system includes an array of platen sections, a plurality of compressive sheets, a chassis, a plurality of actuators, a powder dispenser, and an energy beam source. The array of platen sections individually have a top surface and a plurality of vertical side surfaces intersecting the top surface. The plurality of platen sections are positioned with adjacent pairs of platen sections having a pair of the vertical side surfaces in facing relation with each other and defining a vertical gap therebetween. Thus they define a plurality of vertical gaps over the array of platen sections. The plurality of compressible sheets fill the plurality of vertical gaps. For each facing pair of vertical surfaces, one of the compressible sheets is coupled to one of the facing vertical surfaces and slidingly engages the other of the facing vertical surfaces. The chassis supports the array of platen sections. The plurality of actuators is for individually and vertically positioning the platen sections. The powder dispenser is for dispensing powder upon a build plane defined above the array of platen sections. The energy beam source is for selectively fusing layers of the powder at the build plane.

In one implementation, the top surface of a platen section is hexagonal and each platen section has six vertical surfaces. The compressible sheet can be mounted to three of the six vertical surfaces and not to a remaining three of the six vertical surfaces.

In another implementation, the top surface of the platen section is rectangular or square and each platen section has four vertical surfaces. The compressible sheets can be mounted to two of the four vertical surfaces and not a remaining two of the four vertical surfaces.

In yet another implementation, the compressible sheet can be formed from a fibrous material such as a felt material. The fibrous material can be at least partially formed from aramid fibers. One example of an aramid fiber is chemically chemically known as Poly-paraphenylene terephthalamide which was branded "Kevlar®" by DuPont (E.I. du Pont de Nemours and Company, Wilmington, Del.). Another aramid fiber is known by a trade name of "Nomex®" also branded by DuPont.

In a further implementation, the compressible sheet can be formed from a fibrous material such as a felt material. The fibrous material can be at least partially formed from ceramic fibers. Yet other possible fibers include polyester, wool, carbon fiber, and fiberglass.

In a yet further implementation, system includes a platform housing that surrounds the array of platen sections. The platform housing includes a perimeter of inward facing surfaces that face toward the array of platen sections. A plurality of peripheral gaps are defined between the inward facing surfaces of the platform housing and vertical side surfaces of the platen sections. A peripheral arrangement of compressible sheets fill the peripheral gaps.

In another implementation, the chassis defines a plurality of upward extending slots. The system includes a plurality of vertically oriented rails mounted in the plurality of upward extending slots. A section platform is slidingly coupled to a plurality of the vertically oriented rails. A horizontal cross-section of the rails can be rectangular, solid circular, or some other shape.

In yet another implementation, the system includes an array of vertical shanks that couple the array of platen sections to the array of actuators. The array of vertical shanks can include a lead screw that is coupled to one of the array of platen sections and an adapter that is coupled to one of the array of actuators.

In a second aspect of the disclosure, a three-dimensional printing system includes a printer housing, a build platform assembly, a powder dispenser, and an energy beam source. The printer housing encloses a build chamber having an array of actuators mounted above a lower portion of the build chamber. The build platform assembly includes an array of platform sections, a platform housing, a plurality of compressible sheets and an array of shanks. The array of platen sections correspond to the array of actuators. The platen sections individually include a horizontal top surface and a plurality of vertical side surfaces extending downward from the horizontal top surface. The platform housing laterally surrounds the array of platen sections and has inward facing surfaces that face toward the array of platform sections. The vertical side surfaces and the inward facing surfaces define pairs of vertically facing surfaces with a plurality of gaps between the pairs of vertically facing surfaces. A plurality of compressible sheets fill the gaps. For a pair of vertically facing surfaces, a compressible sheet is attached to one of the pair of vertically facing surfaces and slidingly engages the other of the pair of vertically facing surfaces. The array of shanks corresponds to the array of actuators and the array of platen sections. The array of shanks individually include an upper portion coupled to one of the array of platen sections and a lower portion coupled to one of the array of actuators.

The powder dispenser is for dispensing powder upon a build plane defined above the array of platen sections. The energy beam source is for selectively fusing layers of the powder at the build plane. An actuator driver is coupled to the array of motors. A controller is controllably coupled to the powder dispenser, the energy beam source, and the actuator driver. The controller includes a processer coupled to a non-transient storage device storing software instructions. When executed by the processer, the software instructions operate the powder dispenser, the energy beam source, and the actuator driver to manufacture a three-dimensional article including selectively positioning the platens sections vertically to minimize a use of powder during the manufacture.

DETAILED DESCRIPTION OF THE PREFERRED EMBODIMENTS

FIG. 1 is a schematic diagram of an embodiment of a three-dimensional printing system 2. In describing system 2, mutually orthogonal axes X, Y, and Z can be used. Axes X and Y are lateral axes and generally horizontal. Axis Z is a vertical axis that is generally aligned with a gravitational reference. By "generally" we mean that a measure such as a quantity, a dimensional comparison, or an orientation comparison is by design and within manufacturing tolerances but as such may not be exact. In the description X may be referred to as a first lateral axis and Y may be referred to as a second lateral axis.

System 2 has a printer housing 4 for enclosing an internal build chamber 6 within which a three-dimensional article 8 is to be fabricated in a layer-by-layer deposition and fusion of powder material 10. Within the internal build chamber 6 is a build platform assembly 12 coupled to an array of actuators 14 which are coupled to an actuator driver 15. The build platform assembly 12 includes an array of platen sections 16 that collectively form a segmented or sectioned build platen 18. In the diagram of FIG. 1, six such platen sections 16 are shown in a linear array, but it is to be understood that the platen sections 16 can be disposed along two lateral dimensions.

A gas handling system 20 is coupled to the build chamber 6. The gas handling system 20 is for managing a pressure and composition of gas inside the build chamber 6. Gas handling system 20 can include a vacuum pump for removing ambient air or other gas from the build chamber 6. Gas handling system 20 can also include gas sources for backfilling and pressurizing the build chamber 6 with a non-oxidizing gas such as argon or nitrogen.

A powder dispenser 22 is for dispensing and coating layers of powder 10 at a build plane 24 above the build platen 18. The build plane 24 is defined as an upper surface of a just dispensed layer of powder 10. In an illustrative embodiment, the powder can include one or more of a polymer, a metal, metal alloy, or a ceramic. Metals can include titanium, stainless steel, or an aluminum alloy to name some examples. A metallic material such as zirconium silicate can be used.

A beam system 26 is for generating one or more energy beams 28 and to scan the beam(s) over the build plane 24 to selectively fuse a layer of powder 10. Energy beam(s) 28 can include one or more of a laser radiation beam, an electron beam, or a particle (other than electrons) beam. In an illustrative embodiment, the beam 28 can include laser radiation with a power level of more than 100 watts, more than 500 watts, about 1000 watts, or more than 1000 watts. For polymer powder systems a radiation beam 28 can have powers that are lower than 100 watts.

A controller 30 is controllably coupled to various portions of system 2 including the actuator driver 15, gas handling system 20, the powder dispenser 22, the beam system 26, and other portions of system 2. The controller includes a processor coupled to an information storage device which further includes a non-volatile or non-transient information storage device. The non-transient storage device stores software instructions. When executed by the processor, the software instructions control the various portions of system 2.

By executing software instructions, the controller 30 operates the system to fabricate or manufacture the three dimensional article 8 according to the following steps: (1) The array of actuators 14 selectively vertically position the array of platen sections 16; (2) The powder dispenser 22 dispenses a layer of powder 10 over the array of platen sections 16; (3) The beam system 26 generates and steers beam(s) 28 to selectively fuse the dispensed layer of powder 10 at the build plane 24; (4) Steps (1)-(3) are repeated to complete fabrication of the three dimensional article 8 in a layer-by-layer manner. During this process, some of the platen sections 16 are incrementally lowered. Others can be stopped initially or after a certain number of layers to reduce a use of powder 10 required for fabrication. By operating through the actuator driver 15, the controller 30 can selectively control a height of the platen sections 16 to therefore adjust a topographical geometry of the build platen 18. In particular, the platen sections 16 that are under the article 8 will move incrementally downward during fabrication and platen sections 16 that are not under article 8 will remain in a top starting position. For some geometries of an article 8, the platen sections 16 can be vertically staggered.

Prior to steps (1)-(4) above, the controller 30 can also operate the gas handling system 20 and a door lock system (not shown) in order to evacuate the build chamber 6 (pump out air) and to backfill the build chamber 6 with an inert gas such as nitrogen or argon. After the steps (1)-(4), the controller can operate the gas handling system 20, the door lock system, and other portions of system 2 to prepare for unloading part or all of the build platform assembly 12 with a fabricated or manufactured article 8.

Figure 2:
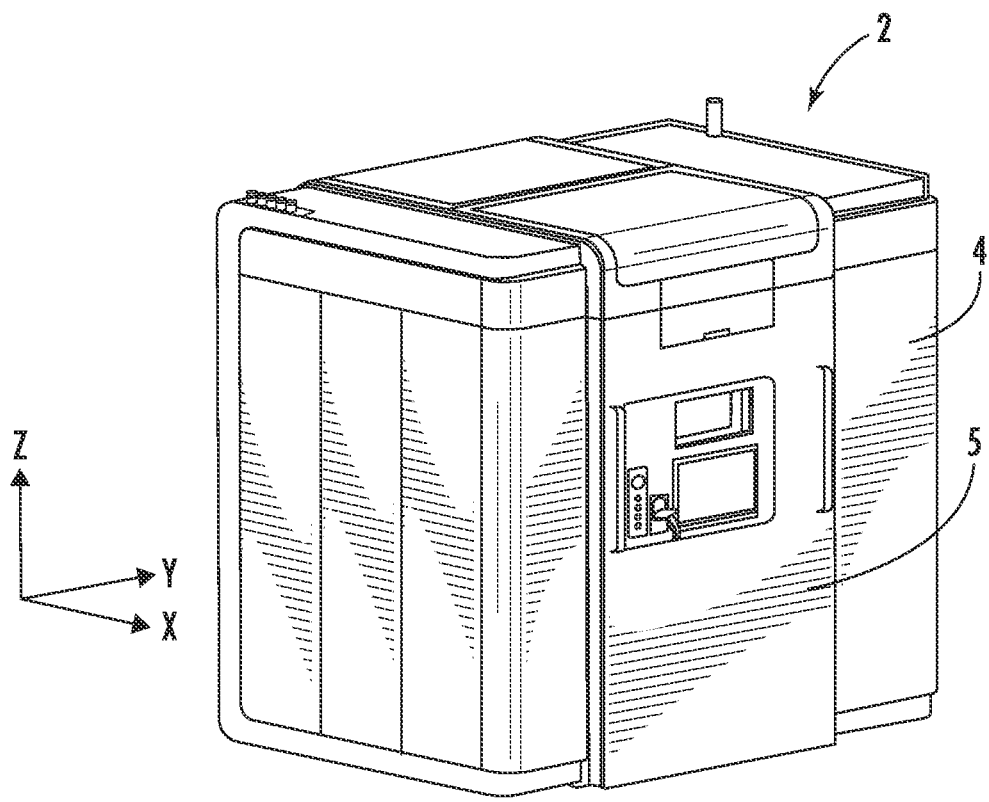
FIG. 2 is an isometric view of an embodiment of a closed three-dimensional printing system.
Figure 3:
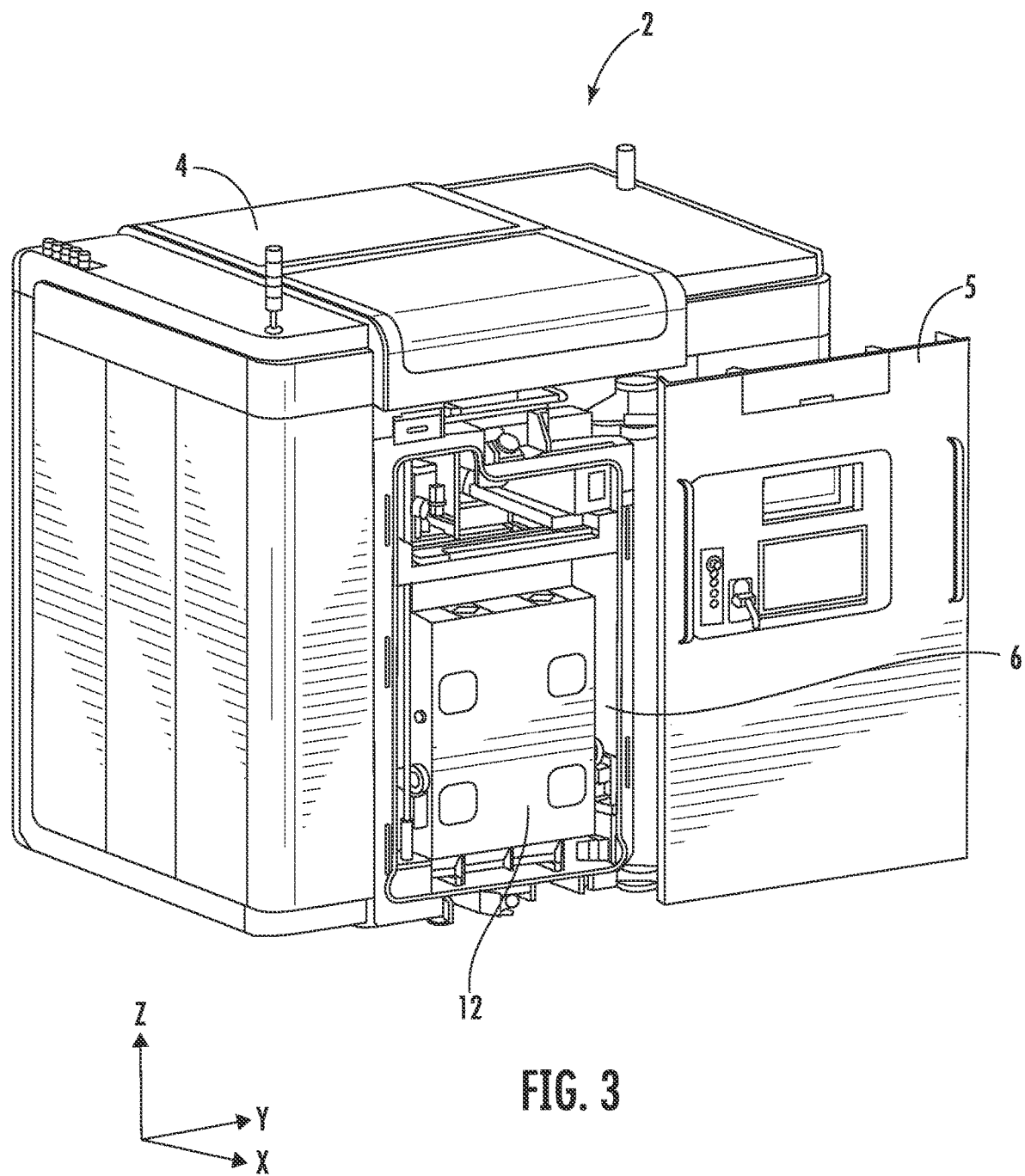
FIG. 3 is an isometric view of an embodiment of a closed three-dimensional printing system with an access door open to allow access to a build chamber.

FIG. 2 is an isometric view of an embodiment of a three-dimensional printing system 2. System 2 has outer housing 4 including an access door 5. The access door 5 can be opened to allow access to the build chamber 6. FIG. 3 is an isometric view of the embodiment of the three-dimensional printing system 2 of FIG. 2 with the access door 5 open. With door 5 open, access to the build chamber 6 enables removal or replacement of the build platform assembly 12.

Figure 4:
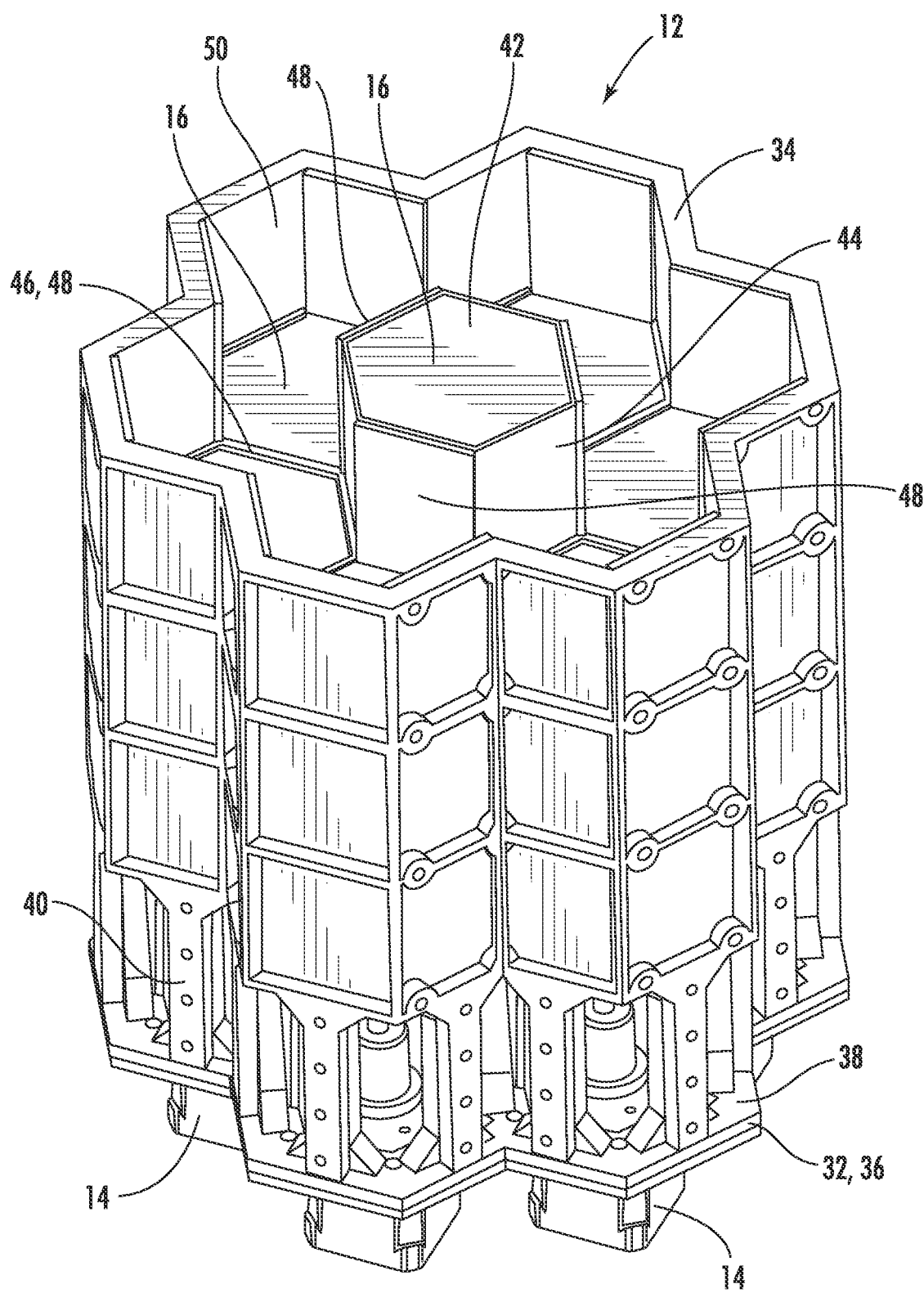
FIG. 4 is an isometric view of a portion of a build platform assembly (hereinafter referred to as a build platform assembly for convenience).

FIG. 4 is an isometric view of an embodiment of a portion of a build platform assembly 12 (hereinafter referred to as a build platform assembly 12 for convenience) and array of actuators 14. The build platform assembly 12 includes a chassis 32 that supports the array of platen sections 16. In the illustrated embodiment, a middle one of the platen sections 16 is shown raised while other platen sections 16 are lowered. Laterally surrounding the platen sections 16 is a platform housing 34. The chassis 32 includes a lower end 36 with an upward facing surface 38. A lower end 40 of the platform housing 34 rests upon the upward facing surface 38 and is coupled to the lower end 36 of the chassis 32. The platen sections 16 individually have a horizontal top surface 42 and a plurality of vertical side surfaces 44 intersecting the top surface 42. In the illustrated embodiment, the platen section 16 includes six such vertical side surfaces 44.

Figure 5:
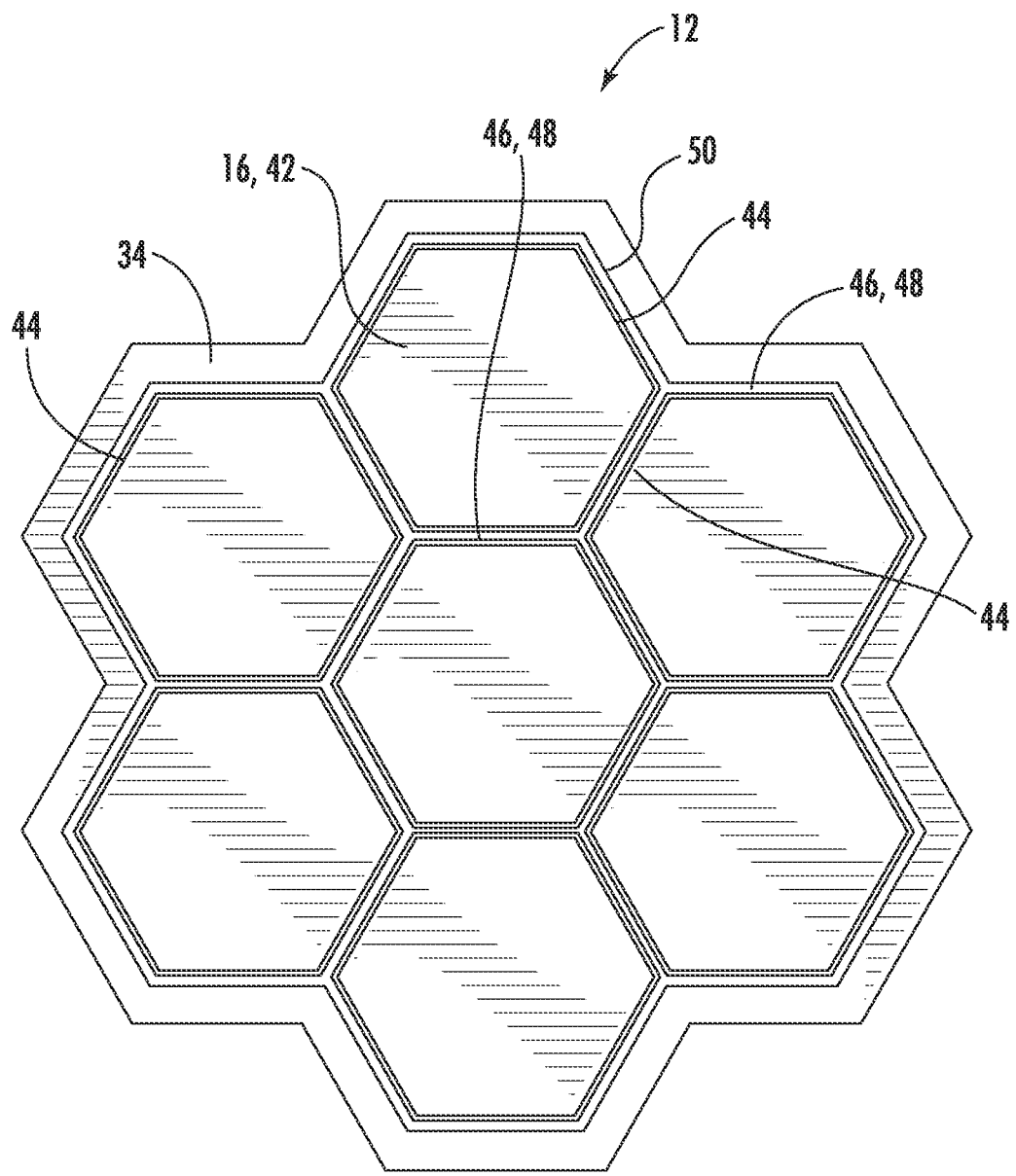
FIG. 5 is a top view of an embodiment of a build platform assembly.

FIG. 5 depicts a top view of the build platform assembly 12. In the illustrated embodiment, the platen sections 16 have a top surface 42 defining a hexagonal shape. The hexagonal shape has advantages over squares or rectangles for minimizing use of powder material 10. However, in alternative embodiments, the top surface can define other shapes such as square, rectangular, triangular or other polygonal shapes. In viewing FIGS. 3 and 4, adjacent pairs of platen sections 16 have a vertical gap 46 between them which is filled with a compressible sheet 48. For a vertical gap 46 there are two opposing and facing vertical side surfaces 44 corresponding to an adjacent pair of platen sections 16. The compressible sheet 48 is fixedly attached to one of the opposing surfaces 44 and vertically slidingly engages the other opposing and facing surface 44.

In the illustrated embodiment, a platen section 16 has three non-adjacent vertical side surfaces 44 having an attached compressive sheet 48. The remaining vertical side surfaces 44 of the platen section 16 do not have a compressive sheet 48, so that all of the vertical gaps 46 can be filled with compressive sheets 48. Stated another way, a compressive sheet 48 is attached to every other vertical side surface 44 of a platen section 16.

The platform housing 34 has a plurality of inward facing vertical surfaces 50. Between one of the vertical surfaces 50 of the platform housing 34 and an adjacent platen section 16 is a vertical gap 46. Between the opposing surfaces 50 and 44 is a compressive sheet 48. The compressive sheet 48 can either be attached to the vertical surface 50 of the platform housing 34 or to the vertical side surface 44 of the platen section 16 that is facing or in opposition to the vertical surface 50. In the illustrated embodiment, the compressive sheets 48 are attached to alternating ones of the vertical surfaces 50.

Stated differently for further clarity: The platform housing 34 laterally surrounds the array of platen sections 16. The platform housing 34 includes a perimeter of inward facing surfaces 50 that face toward the array of platform sections 16. A plurality of peripheral vertical gaps 46 are defined between the inward facing surfaces 50 and the vertical side surfaces 44 of the platen sections 16. A peripheral arrangement of the compressible sheets 48 fill the plurality of peripheral vertical gaps 46.

In various embodiments, the compressible sheets 48 are formed from strong, heat-resistant, and compressible materials such as synthetic fibers. Heat resistance is important for metal powder melting systems. The synthetic fibers can be aramid fibers. One example of an aramid fiber is chemically known as Poly-paraphenylene terephthalamide which was branded "Kevlar®" by DuPont (E.I. du Pont de Nemours and Company, Wilmington, Del.). Another aramid fiber is known by a trade name of "Nomex®" also branded by DuPont. Other possible materials could be polyester, wool, carbon fiber, ceramic, and fiberglass.

The compressible sheets 48 can have a thickness of about 2 to 10 millimeters, 3 to 7 millimeters, 4 to 6 millimeters or about 5 millimeters. The thickness would depend partly upon compressibility and lateral mechanical tolerances of the vertical gaps 46.

In an illustrative embodiment, the compressible sheets 48 would be formed from a fibrous material such as felt. An example of such a material is known as "DEFENDER™ DURAFIBER BOARD" provided by Albarrie Canada Ltd., located in Barrie, ON, Canada. The material is a felt pad that can be formed from Kevlar® (available in thicknesses from about 1.5 to 10.0 millimeters) and Nomex® (available in thicknesses from about 1.6 to 5.0 millimeters).

In the illustrated embodiment, the compressible sheets 48 are attached directly to the vertical side surfaces 44 of the platen sections 16 using fastening means such as screws, rivets, or adhesives. The compressible sheets have a lateral width that is slightly greater than the lateral width of the vertical side surfaces 44 so that three way intersections of the vertical gaps 46 are filled and prevent leakage. In an alternative embodiment, the platen sections 16 can contain spring loaded mechanisms for supporting the sheets 48.

Figure 6:
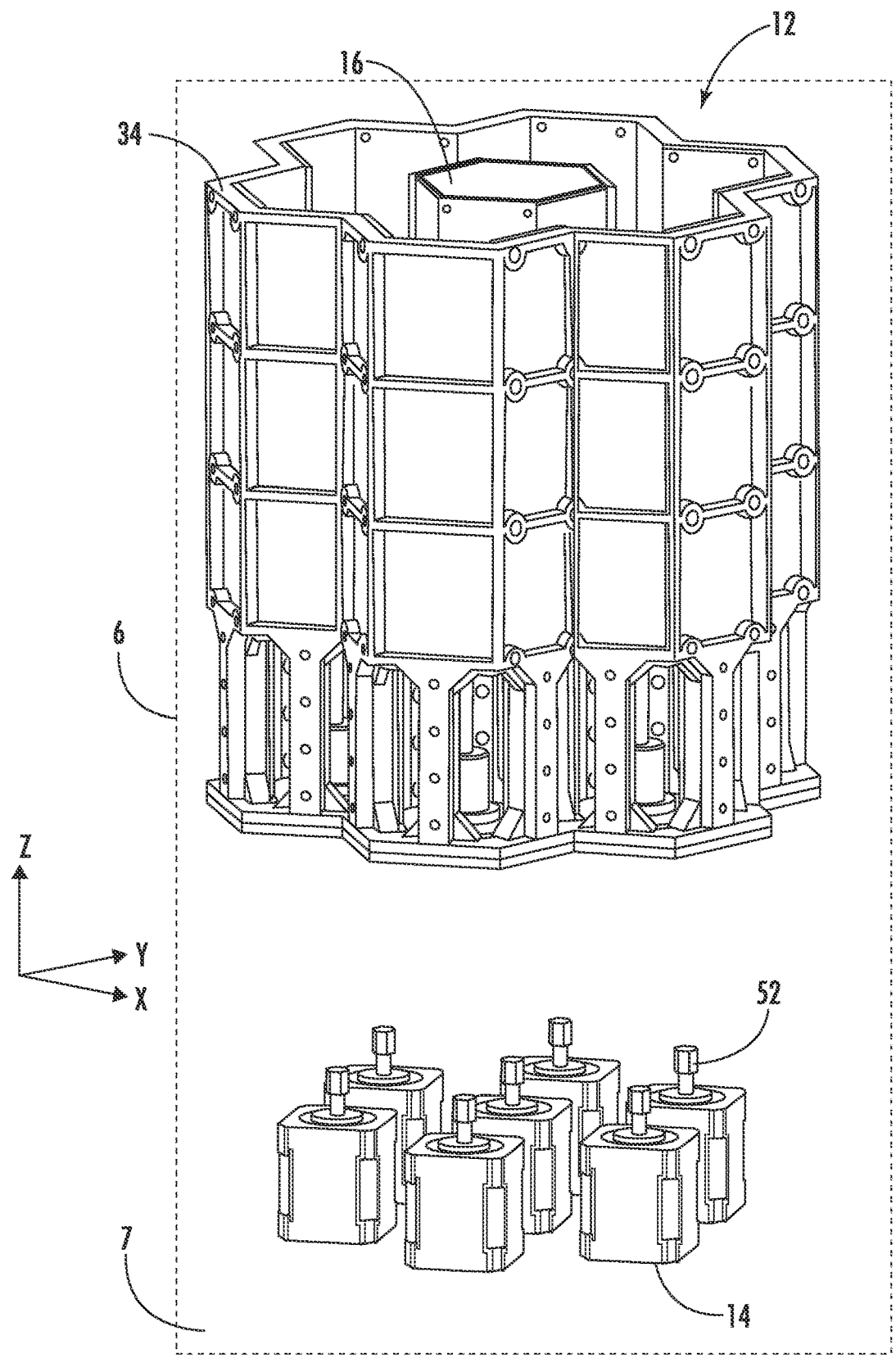
FIG. 6 is a side isometric view of a build platform assembly positioned above an array of motors.

FIG. 6 is an isometric side view of an embodiment of the build platform assembly 12 positioned above an array of actuators or motors 14. The array of motors 14 are positioned above a lower portion 7 of the build chamber 6 and individually include an upward extending shaft 52. When the build platform assembly 12 is lowered into the build chamber 6, the build platform assembly 12 couples to the array of motors 14, allowing the motors to controllably and selectively raise and lower the platen sections 16 under control of controller 30.

Figure 7:
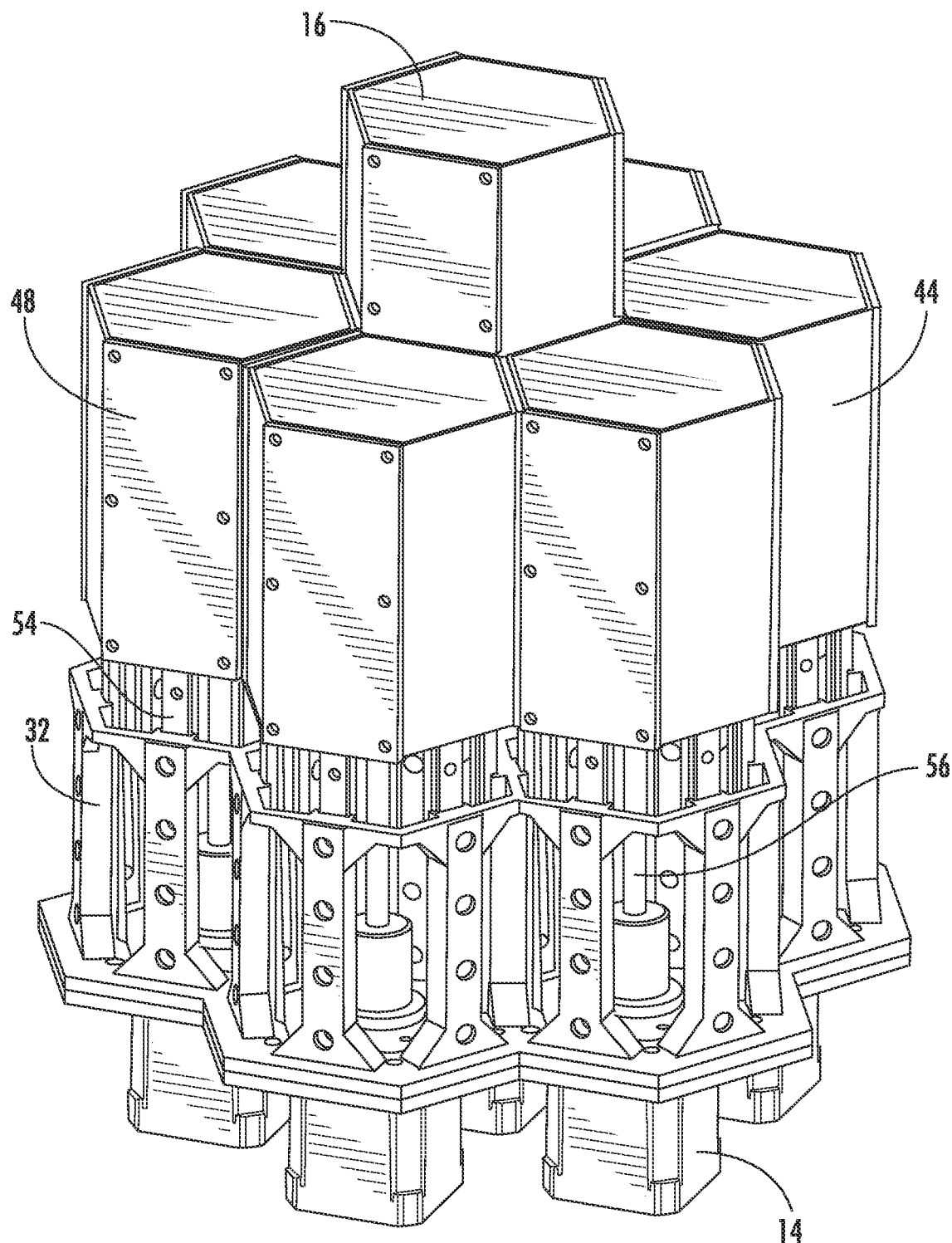
FIG. 7 is an isometric view an array of platen sections mounted in a chassis and coupled to an array of motors.

FIG. 7 is an isometric view of an array of platen sections 16 mounted in chassis 32 without the platform housing 34. Each of the platen sections 16 have a compressible sheet 48 mounted on every other vertical side surface 44. The platen sections 16 are mounted to the chassis 32 via vertically oriented rails 54. An array of the motors 14 corresponds to the array of platen sections 16 and raise and lower the platen sections 16 through motor rotation of vertical shanks 56.

Figure 8:
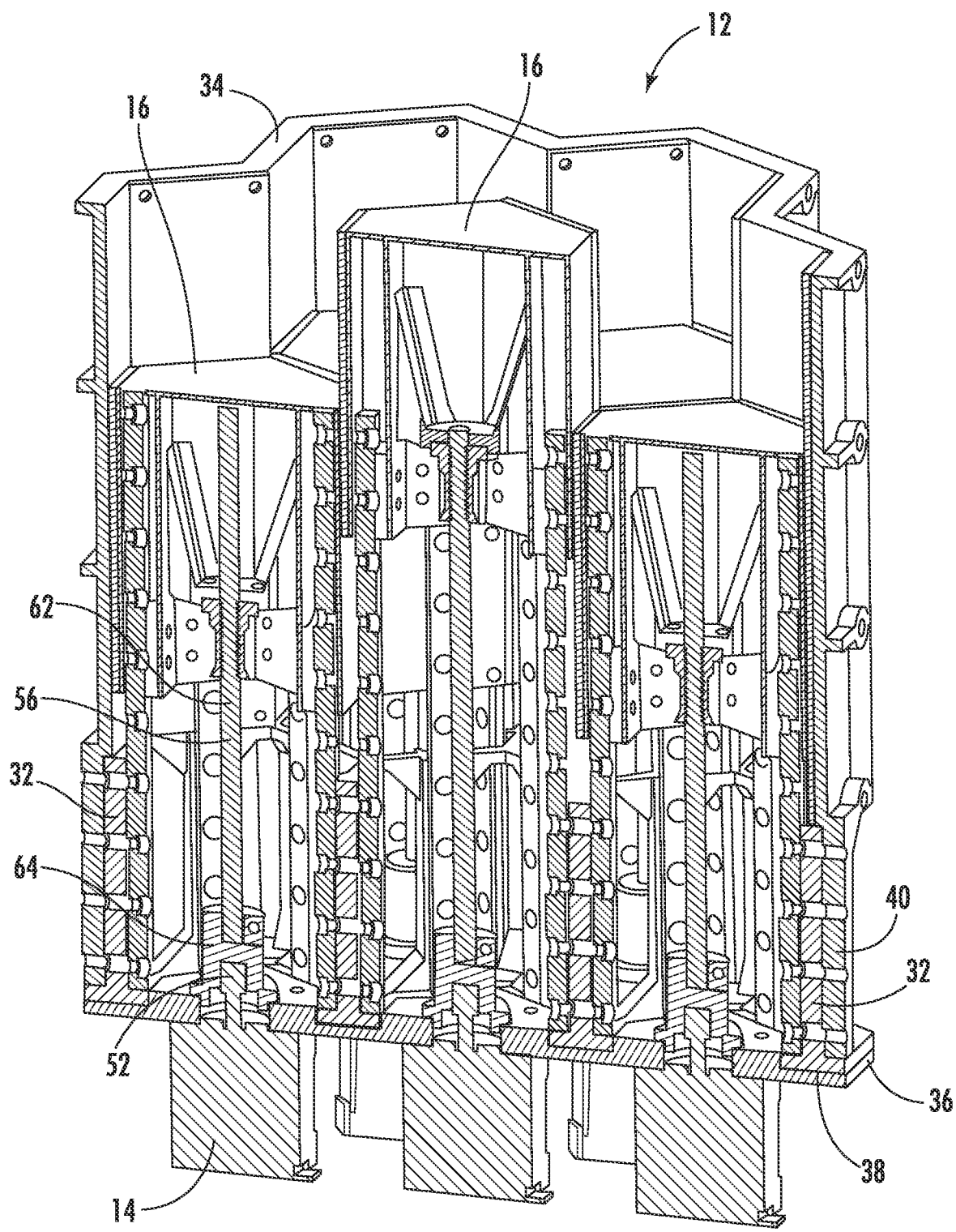
FIG. 8 is a cutaway view of the build platform assembly attached to an array of motors.

FIG. 8 is a cutaway view of the build platform assembly 12. The platform housing 34 is supported by the chassis 32. In the illustrated embodiment, the lower end 40 of the platform housing 34 is directly coupled to the chassis 32. In the illustrated embodiment, the lower end 40 of platform housing 34 also rests on the upward facing surface 38 of the lower end 36 of chassis 32.

Each of the platen sections 16 is coupled to a corresponding motor 14 by a shank 56. The shank 56 includes a lead screw 62 and an adapter 64. The adapter 64 couples the lead screw 62 to the upward extending shaft 52 of the motor 14.

Figure 8A:
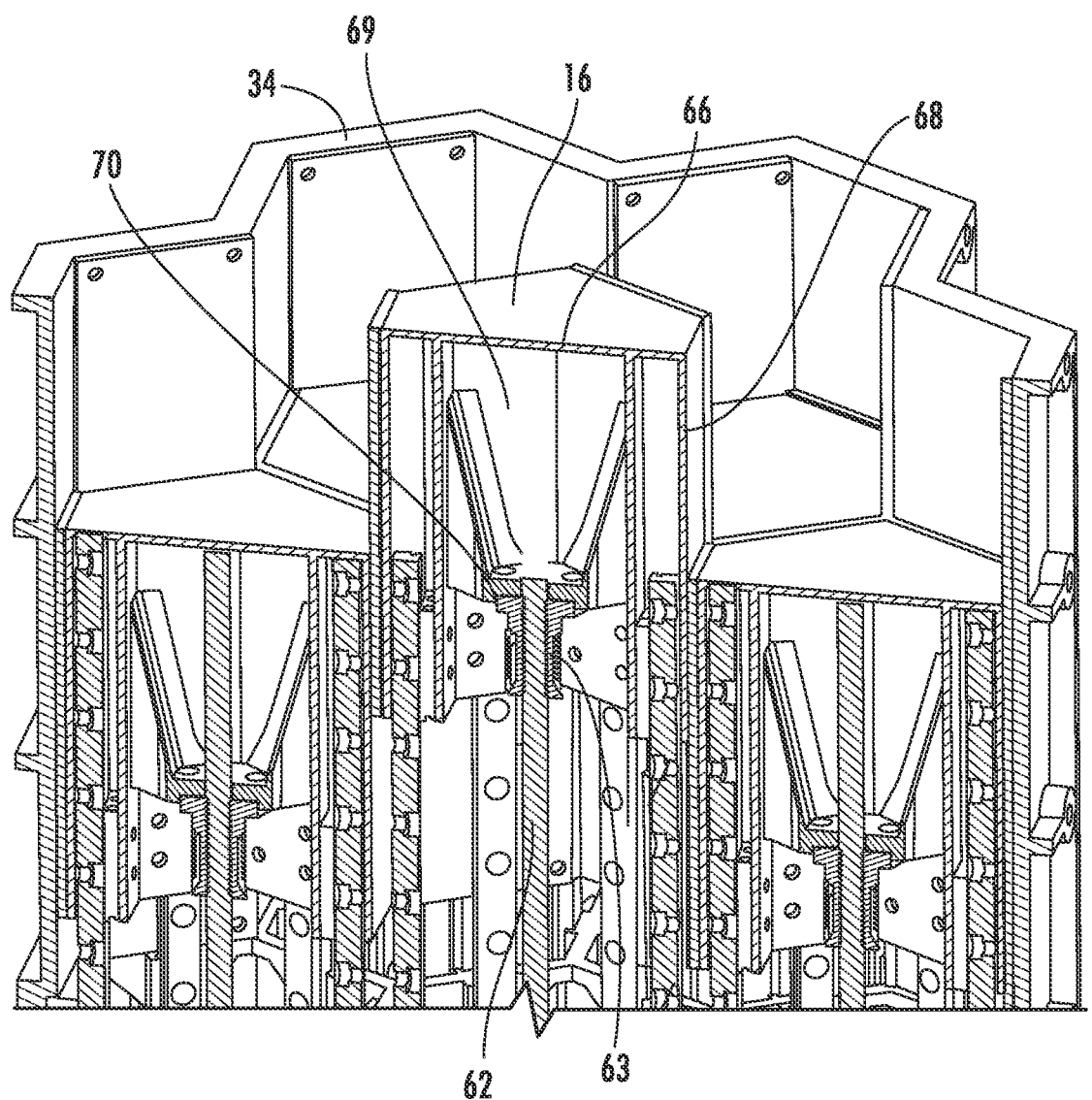
FIG. 8A is an upper portion of the cutaway view of FIG. 8.

FIG. 8A is an upper portion of the cutaway view of FIG. 8. The platen sections 16 are individually hollow and include upper wall 66, side walls 68, and define an inner recess 69 and an opening at a lower end. Side walls 68 depend downward from upper walls 66. Mounted inside each platen section 16 is a nut 70 with inner threads. The lead screw 62 is received within the nut 70. Inner threads of the nut 70 therefore engage outer threads of the lead screw. Rotation of the lead screw 62 will drive the platen section 16 up or down at a rate that is proportional to an angular rate of rotation and a pitch of threads 63 on the lead screw 62. In the illustrated embodiment, nut 70 is an anti-backlash lead nut.

Figure 9:
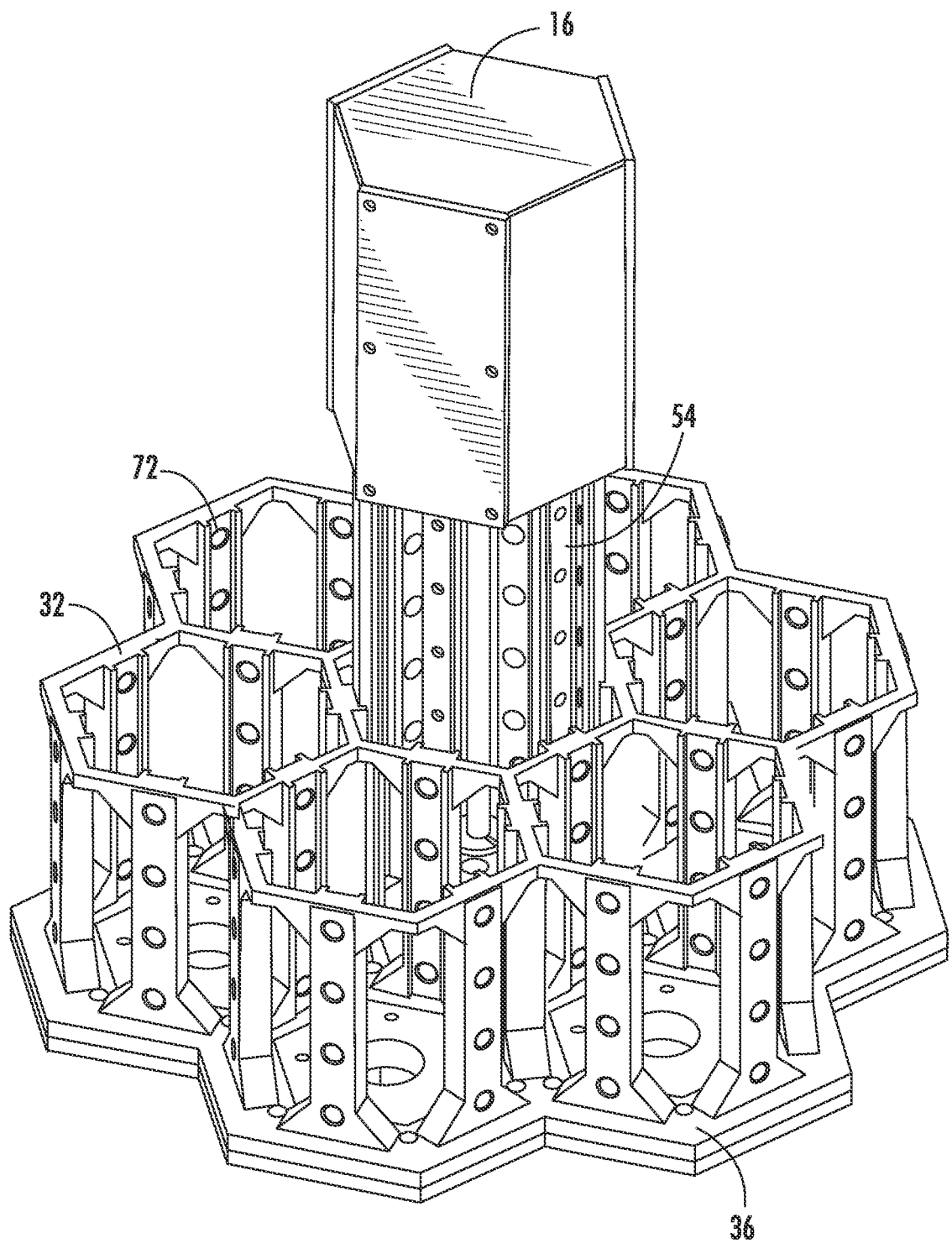
FIG. 9 is an isometric view that depicts the chassis 32 supporting a single platen section.

FIG. 9 is an isometric view that depicts the chassis 32 supporting a single platen section 16 for illustrative purposes. The chassis 32 defines a plurality of vertically extending slots 72 that extend upward from the lower end 36 of the chassis 32. For the hexagonal-shaped platen sections 16, the chassis 32 defines six vertically extending slots 72 for each platen section 16. The vertically extending slots 72 support the rails 54.

Figure 10:
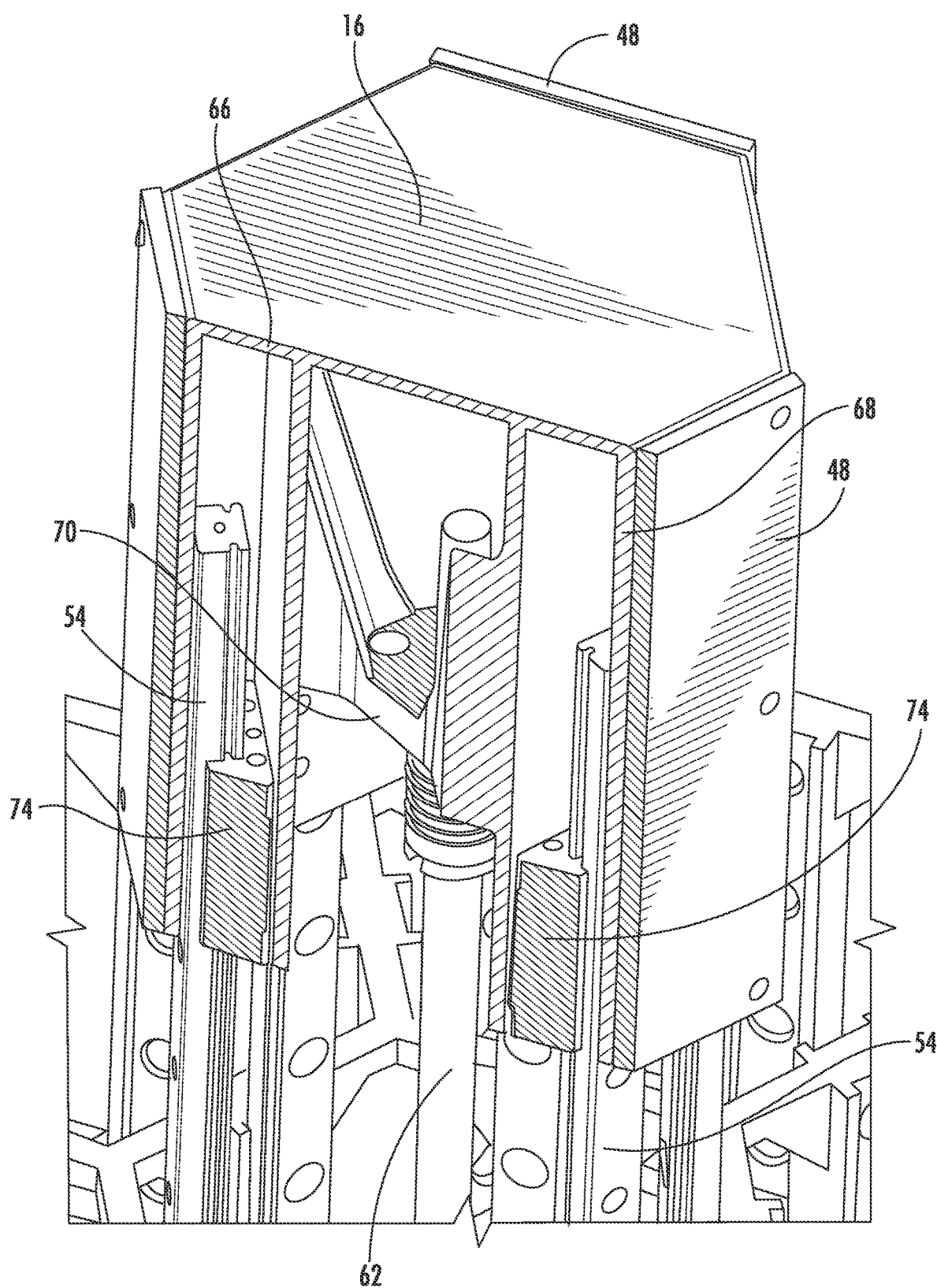
FIG. 10 is a side cutaway view of a single platen section.

FIG. 10 is a side cutaway view of a single platen section 16 that is supported by rails 54 and vertically driven by lead screw 62. Mounted within the platen section 16 are linear bearings 74 that receive the rails 54. The linear bearings 74 slidingly engage the rails 54 to guide the platen section 16 vertically. In the illustrated embodiment, six vertical side walls 68 depend downward from the upper wall 66. A compressible sheet 48 is attached to every other vertical side wall 68. The compressible sheets 48 can be attached via mechanical fasteners (e.g., screws, rivets, etc.), adhesives, or a thermal compression or welding process. Using small screws has an advantage of making the felt easily replaceable.

Figure 11:
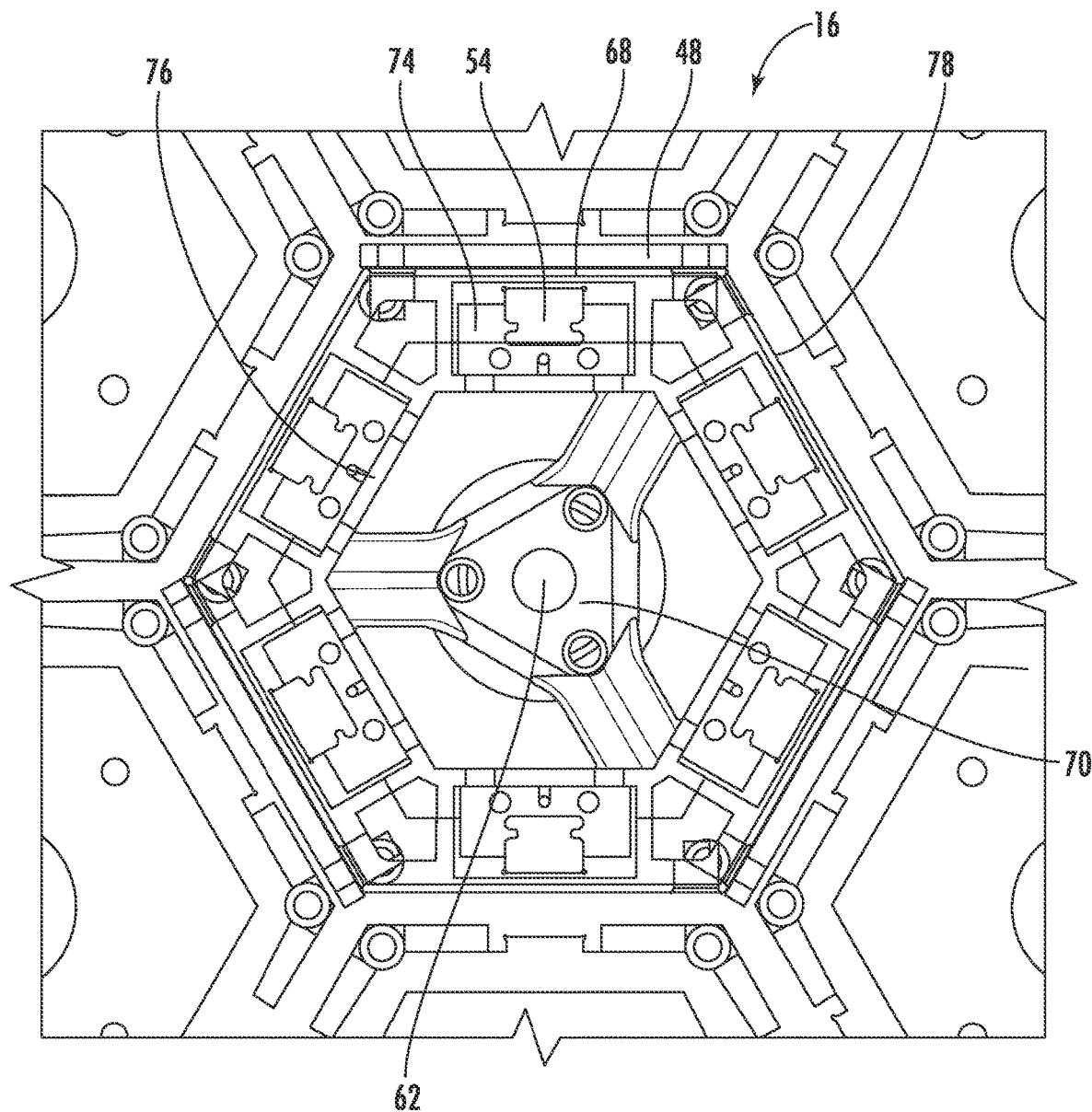
FIG. 11 is a top cutaway view of an array of platen sections with added detail for a central platen section.

FIG. 11 is a top cutaway view of an array of platen sections 16 with added detail for a central platen section 16. In the illustrated embodiment, a single platen section 16 has six linear bearings 74 that are attached within the six side walls 68. The platen section 16 includes an inner wall 76 within an outer wall 78 is defined by the six side walls 68. In the illustrated embodiment, the inner 76 and outer 78 walls each define a hexagonal shape. The linear bearings 74 are mounted to an outside surface of the inner wall 76 and are between the inner wall 76 and outer wall 78. The nut 70 is mounted to an inside surface of the inner wall 76 and is inside the inner wall 76. Also shown are six rails 54 that slidingly engage the six linear bearings 74.

In another embodiment (not shown) the rails 54 can be metal rods 54 having a solid circular cross-section. In this embodiment, three rods 54 can be used, with a rod for every other side of the hexagonal shape of the outer wall 78. The linear bearings 74 for engaging the rods 54 would be high temperature linear bearings. A rigid rail 54 and bearing 74 system is important to maintain accurate vertical gaps 46 to have a consistent compression of the compressible sheets 48.

Figure 12A:
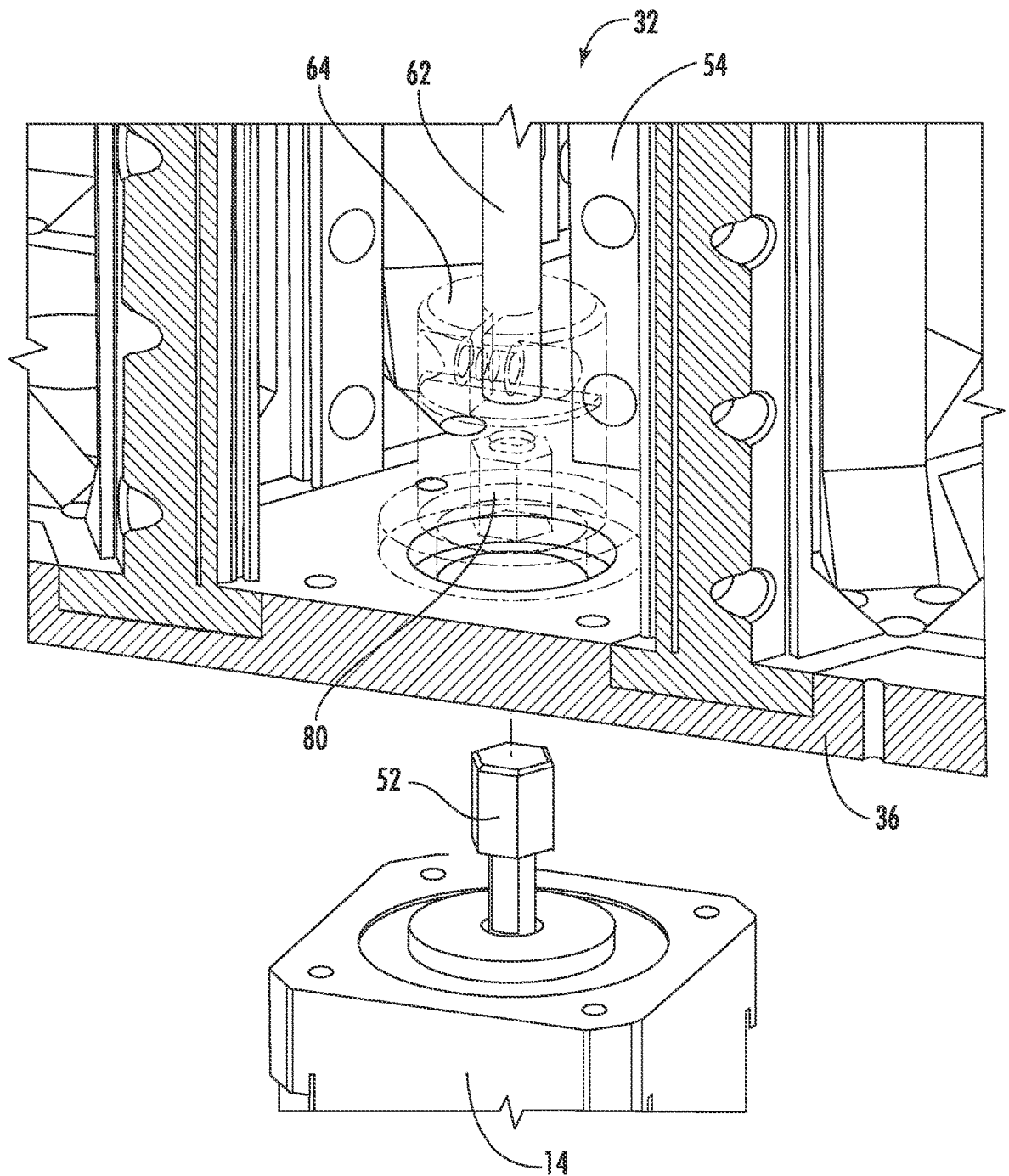
FIG. 12A is a cutaway view of a lower portion of a chassis and motor in a disconnected configuration.
Figure 12B:
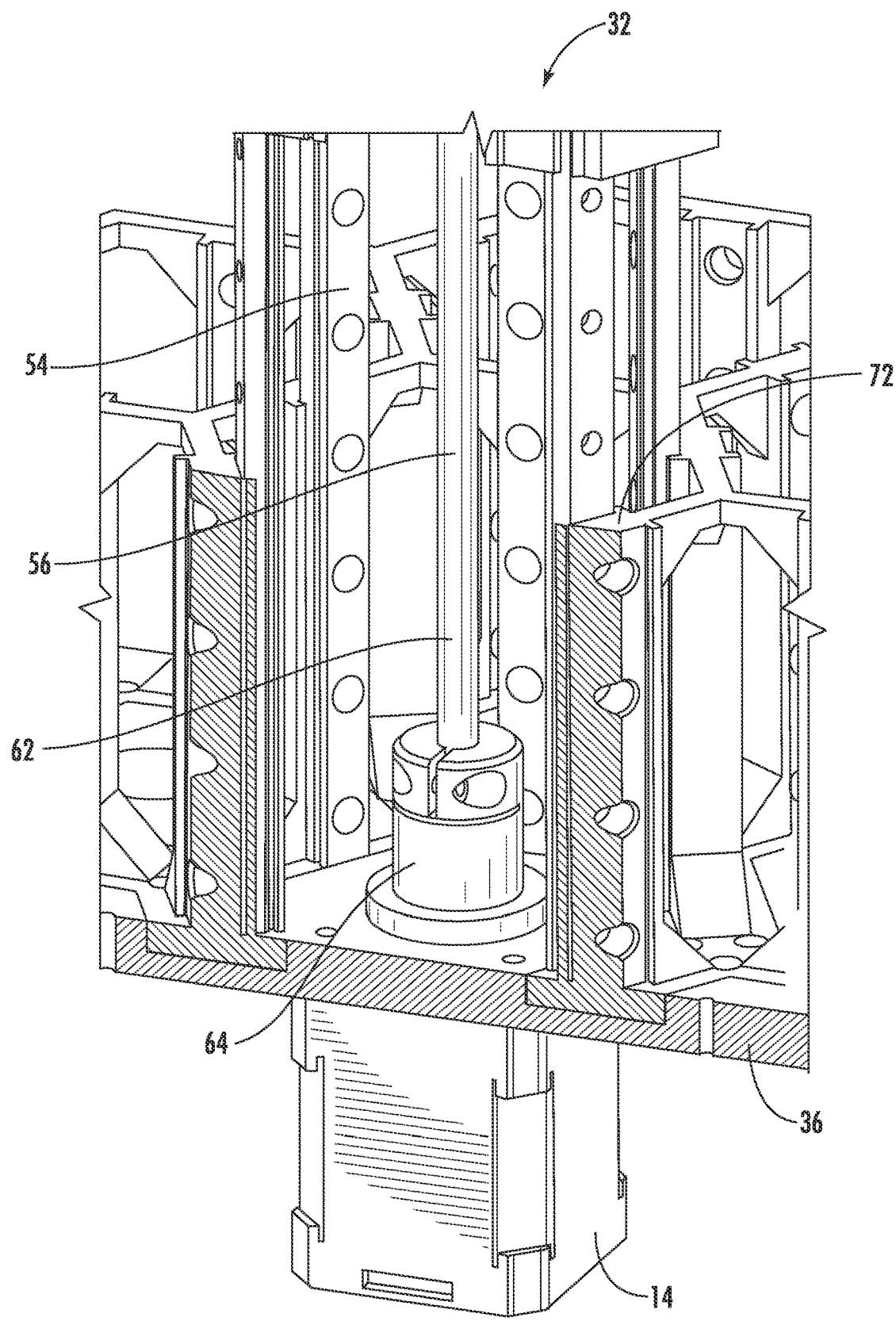
FIG. 12B is a cutaway view of a lower portion of a chassis and motor in a connected configuration.

FIGS. 12A and 12B are cutaway views of a lower portion of the chassis 32 and motor 14 in disconnected (12A) and connected (12B) configurations. In the illustrated embodiment of FIG. 12A, the adapter 64 defines a lower opening 80 for receiving the upward extending shaft 52. The connection between the adapter 64 and shaft 52 can vary as can the designs of shaft 52 and opening 80. For example, some designs may have a detent lock arrangement for coupling shaft 52 and opening 80 together. In one embodiment, the shaft 52 is a splined male shaft (not shown) and the opening is a splined female coupling (not shown). In some embodiments, the actuator 14 may include a sensor (not shown) for verifying proper mechanical coupling.

In the illustrative embodiment of FIG. 12B, the shank 56 is defined as including the lead screw 62 and adapter 64. In the illustrated embodiment, the adapter 64 is clamped to the lead screw 62 by tightening a screw. Other designs are possible such as a lead screw 62 with a machined lower end that mechanically locks into an adapter 64.

The specific embodiments and applications thereof described above are for illustrative purposes only and do not preclude modifications and variations encompassed by the scope of the following claims.

What is claimed:

1. A three-dimensional printing system configured to produce a 3D article through a layer-by-layer selective fusion of powder along a build plane comprising:

an array of platen sections individually having a horizontal top surface and a plurality of vertical side surfaces intersecting the top surface, the platen sections in the array of platen sections are positioned adjacent to each other such that they form adjacent pairs of platen sections, each adjacent pair of platen sections forming a vertical gap between them, each vertical gap defined by a pair of adjacent and facing vertical side surfaces of the corresponding adjacent pair of platen sections, the adjacent pairs of platen sections defining a plurality of vertical gaps over the array of platen sections;

a plurality of compressible sheets that fill the plurality of vertical gaps, for each pair of adjacent and facing vertical side surfaces, one of the compressible sheets is coupled to one vertical side surface of the pair of adjacent and facing vertical side surfaces and slidingly engages another vertical side surface of the pair of adjacent and facing vertical side surfaces; a chassis for supporting the array of platen sections, the chassis defining a plurality of upward extending slots;

a plurality of vertically oriented rails mounted in each upward extending slot of the plurality of upward extending slots, each platen section is slidingly coupled to the plurality of vertically oriented rails in each upward extending, slot;

a plurality of actuators for individually and vertically positioning the platen sections; and an energy beam source for selectively fusing a layer of the powder at the build plane.

2. The three-dimensional printing system of claim 1 wherein the top surface of each platen section is hexagonal and each platen section has six vertical side surfaces.

3. The three-dimensional printing system of claim 2 wherein three vertical side surfaces of the six vertical side surfaces individually have one compressible sheet of the plurality of compressible sheets coupled thereto.

4. The three-dimensional printing system of claim 1 wherein the compressible sheets are made of a fibrous material.

5. The three-dimensional printing system of claim 4 wherein the fibrous material is at least partially formed from aramid fibers.

6. The three-dimensional printing system of claim 4 wherein the fibrous material is at least partially formed from ceramic fibers.

7. The three-dimensional printing system of claim 1 wherein the compressible sheets are formed at least partially from aramid fibers.

8. The three-dimensional printing system of claim 1 further comprising:
a platform housing that laterally surrounds the array of platen sections, the platform housing includes a perimeter of inward facing surfaces that face toward the array of platen sections, a plurality of peripheral vertical gaps are defined between the inward facing surfaces of the platform housing and vertical side surfaces of the platen sections, a peripheral arrangement of compressible sheets fill the peripheral vertical gaps.

9. The three-dimensional printing system of claim 8 wherein for a pair of vertical surfaces including one of the inward facing surfaces of the platform housing and one of the vertical side surfaces of the platen sections, one compressible sheet of the peripheral arrangement of compressible sheets is attached to one vertical surface of the pair of vertical surfaces and is in vertical sliding engagement with another vertical surface of the pair of vertical surfaces.

10. The three-dimensional printing system of claim 8 wherein the platform housing has a lower end that is vertically supported by the chassis.

11. The three-dimensional printing system of claim 1 further comprising an array of vertical shanks that couple the array of platen sections to the plurality of actuators.

12. The three-dimensional printing system of claim 11 wherein the array of vertical shanks individually include a lead screw that is coupled to one platen section of the array of platen sections and an adapter that is coupled to one actuator of the plurality of actuators.

13. A three-dimensional printing system configured to manufacture a 3D article through a layer-by-layer fusion of powder along a build plane comprising:
a printer housing enclosing a build chamber having an array of motors mounted above a lower portion of the build chamber;
a build platform assembly including:
an array of platen sections corresponding to the array of motors, the platen sections individually including a horizontal top surface and a plurality of vertical side surfaces extending downward from the horizontal top surface;
a platform housing that laterally surrounds the array of platen sections and having inward facing vertical surfaces that face toward the array of platen sections;
a chassis defining an array of upward extending slots;
a plurality of vertically oriented rails mounted in each upward extending slot of the array of upward extending slots, each platen section of the array of platen sections is slidingly coupled to one or more vertically oriented rails of the plurality of the vertically oriented rails in each upward extending slot;
a plurality of gaps are defined between some of the plurality of vertical side surfaces and the inward facing vertical surfaces, each gap in the plurality of gaps is defined by a pair of vertically facing surfaces including one vertical side surface and one inward facing vertical surface;
a plurality of compressible sheets filling the plurality of gaps, for each pair of vertically facing surfaces, a compressible sheet of the plurality of compressible sheets is attached to one vertical facing surface of the pair of vertically facing surfaces and slidingly engages the other vertically facing surface of the pair of vertically facing surfaces; and
an array of shanks corresponding to the array of motors and the array of platen sections, the array of shanks individually including an upper portion coupled to one platen section of the array of platen sections and a lower portion coupled to one motor of the array of motors;
an energy beam source for selectively fusing a layer of the powder at the build plane;
an actuator driver coupled to the array of motors; and
a controller controllably coupled to the energy beam source and the actuator driver, the controller including a processor coupled to a non-transient storage device storing software instructions, when executed by the processor the software instructions operate the energy beam source and the actuator driver to manufacture the 3D article and to selectively position the platen sections vertically during the manufacture to reduce a use of powder.

14. The three-dimensional printing system of claim 13 wherein the top surface of each platen section in the array of platen sections is hexagonal and each platen section has six vertical side surfaces.

15. The three-dimensional printing system of claim 14 wherein a compressible sheet is mounted to each of three vertical side surfaces of the six vertical side surfaces.

16. The three-dimensional printing system of claim 13 wherein the compressible sheets are made of a fibrous material.

17. The three-dimensional printing system of claim 13 wherein the compressible sheets are formed at least partially from an aramid material.

18. A three-dimensional printing system configured to produce a 3D article through a layer by layer selective fusion of powder along a build plane comprising:
a printer housing enclosing a build chamber;
a build platform positioned within the build chamber and including:
an array of platen sections individually including a horizontal top surface and defining an array of gaps between individual platen sections of the array of platen sections;
a plurality of compressible sheets that individually fill a gap of the array of gaps;
a chassis defining a plurality of upward extending slots;
a plurality of vertically oriented rails mounted in each upward extending slot of the plurality of upward extending slot, each platen section of the array of platen sections is slidingly coupled to one or more vertically oriented rails of the plurality of vertically oriented rails in each upward extending slot; and
a plurality of actuators, each actuator coupled to a platen section of the array of platen sections for individually and vertically positioning the platen sections;
an energy beam source for selectively fusing a layer of the powder at the build plane;
an actuator driver coupled to the plurality of actuators; and
a controller configured to operate portions of the three-dimensional printing system including the actuator driver and the energy beam source to produce the 3D article.

19. The three-dimensional printing system of claim 18 further comprising a platform housing that laterally surrounds the array of platen sections, a plurality of gaps are defined between the platform housing and the array of platen sections, some compressible sheets of the plurality of compressible sheets individually fill a gap of the plurality of gaps defined between the platform housing and the array of platen sections.

20. The three-dimensional printing system of claim 18 wherein the compressible sheets include aramid fibers and/or ceramic fibers.

\* \* \* \* \*